US012548717B2

(12) United States Patent
Sullivan et al.

(10) Patent No.: US 12,548,717 B2
(45) Date of Patent: Feb. 10, 2026

(54) HERMETICALLY SEALED MANUAL DISCONNECT WITH INTEGRATED BELLOWS ACTUATOR

(71) Applicant: RINCON POWER, LLC, Carpinteria, CA (US)

(72) Inventors: Daniel Charles Sullivan, Santa Barbara, CA (US); Justin McAllister, Ventura, CA (US)

(73) Assignee: Rincon Power, LLC, Carpinteria, CA (US)

( * ) Notice: Subject to any disclaimer, the term of this patent is extended or adjusted under 35 U.S.C. 154(b) by 99 days.

(21) Appl. No.: 18/280,650

(22) PCT Filed: Mar. 9, 2022

(86) PCT No.: PCT/US2022/019560

§ 371 (c)(1),
(2) Date: Sep. 6, 2023

(87) PCT Pub. No.: WO2022/192406

PCT Pub. Date: Sep. 15, 2022

(65) Prior Publication Data

US 2024/0153717 A1 May 9, 2024

Related U.S. Application Data

(60) Provisional application No. 63/200,492, filed on Mar. 10, 2021.

(51) Int. Cl.

*H01H 1/66* (2006.01)
*H01H 9/04* (2006.01)
(Continued)

(52) U.S. Cl.

CPC .............. *H01H 1/66* (2013.01); *H01H 9/041* (2013.01); *H01H 50/023* (2013.01); *H01H 50/56* (2013.01); *H01H 2050/025* (2013.01)

(58) Field of Classification Search

None
See application file for complete search history.

(56) References Cited

U.S. PATENT DOCUMENTS 2,230,277 A 2/1941 Volker et al.
2,854,536 A 9/1958 Beer
(Continued)

FOREIGN PATENT DOCUMENTS

CN 104718596 A * 6/2015 .............. H01H 1/64
CN 205122415 3/2016
(Continued)

OTHER PUBLICATIONS

Machine translation of Liu (CN205122415U) (Year: 2016).*
(Continued)

*Primary Examiner* — Bernard Rojas
(74) *Attorney, Agent, or Firm* — Fish & Richardson P.C.

(57) ABSTRACT

A manual disconnect switching device includes an external housing having a handle actuator. The manual disconnect switching device further includes a bellows actuator in communication with the handle actuator and hermetically sealed within an internal volume of the external housing. The bellows actuator includes a shaft and a biased bellows for switching the manual disconnect switching device between open and closed positions.

20 Claims, 13 Drawing Sheets

(51) Int. Cl.
*H01H 50/02* (2006.01)
*H01H 50/56* (2006.01)

(56) References Cited

U.S. PATENT DOCUMENTS

| | | | | |
|---|---|---|---|---|
| 3,052,784 | A | 9/1962 | Ousley | |
| 4,015,226 | A | 3/1977 | Stomma et al. | |
| 4,568,804 | A | 2/1986 | Luehring | |
| 5,680,084 | A | 10/1997 | Kishi et al. | |
| 6,098,663 | A | 8/2000 | Larsen | |
| 6,121,561 | A | 9/2000 | Sweeney | |
| 6,204,460 | B1 * | 3/2001 | Hojo | H01H 1/66 335/151 |
| 7,868,720 | B2 | 1/2011 | Bush et al. | |
| 8,446,240 | B2 | 5/2013 | Swartzentruber et al. | |
| 9,013,254 | B2 | 4/2015 | Molyneux et al. | |
| 9,336,970 | B2 * | 5/2016 | Koeda | H01H 3/42 |
| 10,096,942 | B2 | 10/2018 | Molyneux et al. | |
| 11,749,477 | B2 * | 9/2023 | Das | H01H 33/664 361/131 |
| 2011/0120846 | A1 | 5/2011 | Ito et al. | |
| 2013/0102175 | A1 | 4/2013 | Molyneux et al. | |
| 2016/0099123 | A1 * | 4/2016 | Ohda | H01H 33/38 335/170 |

FOREIGN PATENT DOCUMENTS

| | | | | |
|---|---|---|---|---|
| CN | 208861882 | U | * | 5/2019 |
| EP | 2767998 | | | 8/2014 |
| JP | 2006079989 | A | * | 3/2006 |

OTHER PUBLICATIONS

Machine translation of Yu (CN-208861882-U) (Year: 2018).*
Machine translation of Miyata (JP 2006079989 A) (Year: 2006).*
Machine translation of Naka (CN 104718596 A) (Year: 2015).*
Extended European Search Report in European Appln. No. 22767902.4, mailed on Jul. 12, 2024, 23 pages.
International Preliminary Report on Patentability in International Appln. No. PCT/US2022/019560, mailed on Sep. 21, 2023, 7 pages.
International Search Report and Written Opinion in International Appln. No. PCT/US2022/019560, mailed on Aug. 16, 2022, 10 pages.

* cited by examiner

HERMETICALLY SEALED MANUAL DISCONNECT WITH INTEGRATED BELLOWS ACTUATOR

CROSS-REFERENCE TO RELATED APPLICATIONS

The present application claims priority to U.S. provisional patent application Ser. No. 63/200,492, filed Mar. 10, 2021, entitled HERMETICALLY SEALED MANUAL DISCONNECT WITH INTEGRATED BELLOWS ACTUATOR, the contents of which are incorporated by reference.

TECHNICAL FIELD

Example embodiments of the present disclosure generally relate to manual disconnects, and more particularly, hermetically sealed high voltage manual disconnect switch assemblies.

BACKGROUND

Manual disconnects are used in many applications to open and close electrical circuits. The primary function of a manual disconnect is to provide electrical isolation in the open position and provide a low resistance connection in the closed position. Manual disconnect devices are currently manufactured in both hermetic and non-hermetic packages. Hermetically sealed manual disconnects have many performance advantages over open air manual disconnect devices. Hermetically sealed switching devices in general can be designed with smaller contact air gaps resulting in a smaller product size. Hermetically sealed devices can be pumped down and backfilled with specific gases allowing the use of pure un-plated copper contacts. Copper contacts will not oxidize in this hermetically sealed environment. This results in very low contact resistance and optimum current carry performance. Hermetically sealed switching devices can also be backfilled with gases such as Hydrogen and Nitrogen that improve dielectric withstand voltage strength and switching performance. Currently there is no commercially available hermetically sealed manual disconnect that has a mechanical life greater than 20,000 cycles.

DETAILED DESCRIPTION OF THE DISCLOSURE

Figure 1:
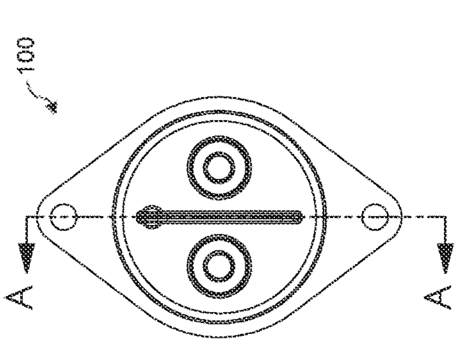
FIG. 1 is a top view of one embodiment of a hermetically sealed high voltage manual disconnect with integrated bellows actuator shown in the open position according to the present disclosure.

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

A first objective of the present disclosure is to greatly improve mechanical life over what is currently available. The present disclosure incorporates a bellows actuator in a hermetically sealed switch assembly. The bellows actuator as utilized in the present disclosure offers a greater mechanical life than a diaphragm style actuator with the same design envelope.

Applications are increasingly moving towards higher voltages. A second objective of the present disclosure is to allow for the increase of the dielectric withstand voltage capability without needing to radically redesign the device. The integrated bellows actuator described herein allows for the ability to easily increase the contact air gap and actuator travel by increasing the number of convolutions thus resulting in higher dielectric withstand voltage.

A third objective of the present disclosure is to provide a low cost hermetically sealed high voltage manual disconnect. Bellows are manufactured in a variety of different methods, many of which are labor intensive and expensive. To reduce cost and improve manufacturability the present disclosure illustrates the use of a low-cost hydroforming method.

A fourth objective of the present disclosure is to provide a modular layout which allows many different configurable products to all share a common hermetically sealed disconnect with integrated bellows actuator module. This modular approach allows for the integration of an external electromagnetic actuator, which adds the functionality of a contactor to the device. It also allows for the integration of an external pyrotechnic actuator, thereby adding the functionality of a pyrotechnic fuse to the device.

In one embodiment of the present disclosure, a manual disconnect switching device includes an external housing having: a top cap with at least two electrically insulated stationary contact feedthroughs; a lower housing with at least two internal helical guide surface; and a manual handle actuator with at least two protrusion features that each communicate with a corresponding one of the helical guide surfaces. The manual disconnect switching device may further include an internal switching assembly hermetically sealed within an internal volume of the external housing, wherein the internal switching assembly may include: a metal housing having a moveable contact; a shaft in communication with the handle actuator and the moveable contact; a biased bellows with first and second ends, wherein the first end is hermetically sealed to the metal housing (e.g., by various welding methods such as laser welding, tig welding, or resistance welding) and the second end is hermetically sealed to the shaft housing (e.g., by various welding methods such as laser welding, tig welding, or resistance welding) and wherein the shaft is located internally to the bellows and at least partially protrudes through both the first end and the second end of the bellows; and at least two conductive stationary contacts that are hermetically sealed by an electrical isolator substrate through the feedthroughs of the top cap. In some embodiments, the handle actuator is switchable from an open position to a closed position, wherein, in the closed position, the handle actuator applies a force to the internal switching assembly in a direction toward the stationary contacts that places the bellows into a compressed position, and in the open position, the handle actuator releases the force to allow bias of the bellows to return the bellows to a resting position. In an embodiment, when the handle actuator is in the open position, the protrusion features are at a first end of the helical guide surfaces and the moveable contact is not electrically contacting the stationary contacts, and when the handle actuator is in the closed position, the protrusion features are at a second end of the helical guide surfaces causing the handle actuator to displace the shaft to compress the bellows and apply force to the moveable contact to create electrical contact between the moveable contact and the stationary contacts. The helical guide surfaces may have features to allow for retention of the handle actuator at the open and closed positions.

In some embodiments, the internal switching assembly may further include a contact spring located adjacent to the shaft, wherein the contact spring may be at least partially (or completely) internal to the bellows, or the contact spring may be completely external to the bellows. In some embodiments including the contact spring, in the closed position, the force of the handle actuator displaces the shaft and the contact spring in the direction of the stationary contacts, which causes the moveable contact to electrically contact the stationary contacts.

The bellows may be corrosion resistant, heat resistant, and/or formed by a non-permeable, hydroformed metal material. In one embodiment, an internal surface of the bellows is adjacent to the internal volume of the external housing and the external surface of the bellows is adjacent to an external environment outside of the hermetically sealed internal switching assembly. The shaft may be a singular conductive structure, or the shaft may be formed by multiple conductive and/or non-conductive structures. The electrical isolator substrate may be hermetically sealed to a circumferential metal flange and the metal flange may be hermetically sealed to the metal housing. Various methods of hermetic sealing may be used for this connection, including tig welding, laser welding, or resistance welding.

In another embodiment of the present disclosure, a manual disconnect switching device includes: an external housing having a handle actuator; a bellows actuator in communication with the handle actuator and hermetically sealed within an internal volume of the external housing, wherein the bellows actuator has at least a shaft and a bellows; an electromagnetic actuator in communication with the shaft; and a pyrotechnic actuator in communication with the shaft. In this embodiment, the electromagnetic actuator and the pyrotechnic actuator may switch the manual disconnect switching device to an open and a closed position. The electromagnetic actuator may be modular and can be located outside of the internal volume of the external housing. In some embodiments, the manual disconnect switching device further includes an electromagnetic safety lockout actuator that is in communication with the handle actuator. When activated, the electromagnetic safety lockout actuator can prevent movement of the handle actuator.

A first example embodiment of the present disclosure provides a hermetically sealed manual disconnect with integrated bellows actuator, as shown generally in FIGS. 1-9. This embodiment can be a compact, mechanically robust, and cost effective device and can open and close an electrical circuit through external manual actuation. In the open position, the device is designed to isolate, while in the closed position, the device is designed to carry current with minimal heat loss (low contact resistance).

Figure 1A:
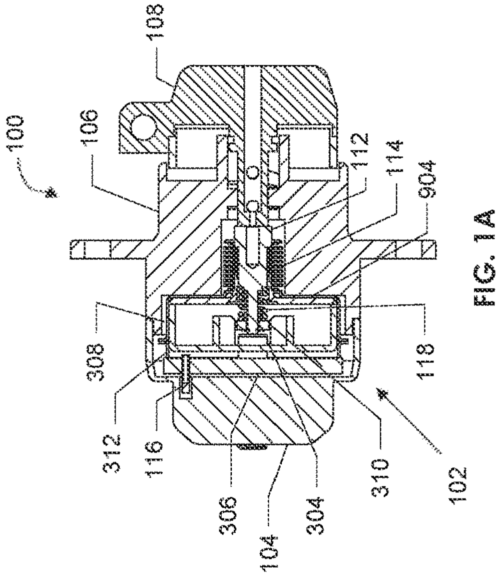
FIG. 1A is a sectional view of FIG. 1 shown in the open position according to the present disclosure.
Figure 2:
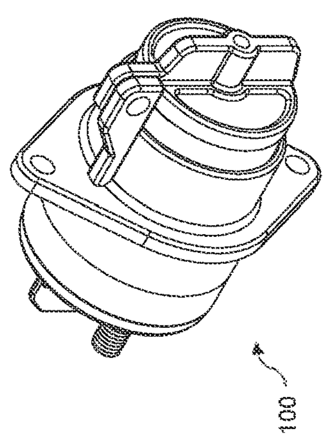
FIG. 2 is a perspective view of one embodiment of a hermetically sealed high voltage manual disconnect with integrated bellows actuator shown in the open position according to the present disclosure.
Figure 3:
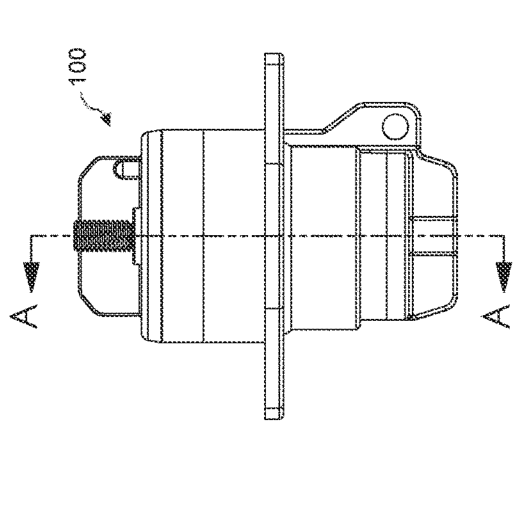
FIG. 3 is a side view of one embodiment of a hermetically sealed high voltage manual disconnect with integrated bellows actuator shown in the open position according to the present disclosure.
Figure 3A:
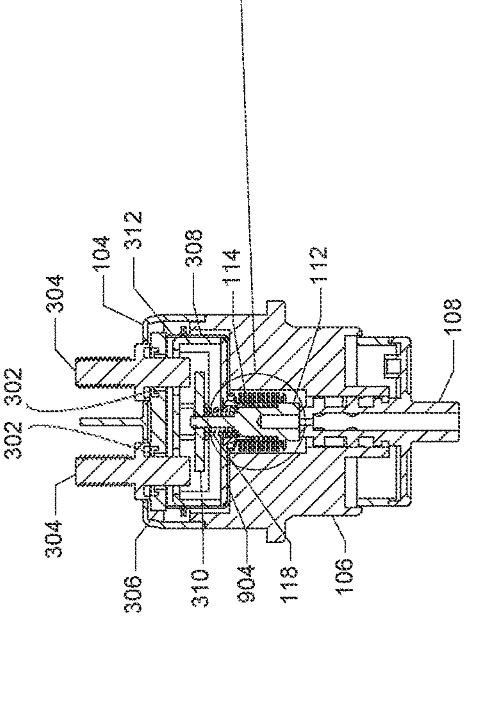
FIG. 3A is a sectional view of FIG. 3 shown in the open position according to the present disclosure.
Figure 3B:
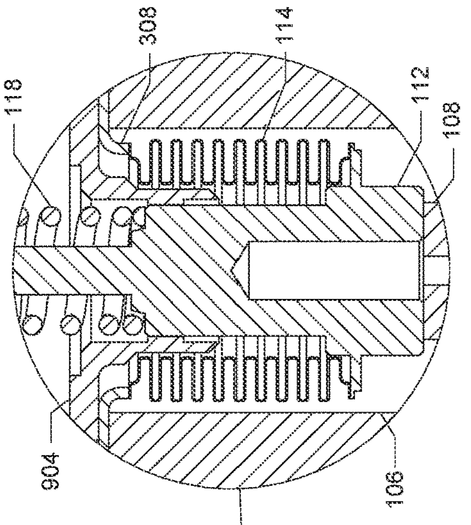
FIG. 3B is a detailed sectional view of FIG. 3A illustrating the integrated bellows actuator, shown in the open position according to the present disclosure.
Figure 5:
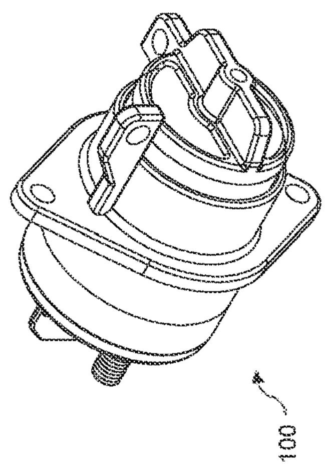
FIG. 5 is a perspective view of one embodiment of a hermetically sealed high voltage manual disconnect with integrated bellows actuator shown in the closed position according to the present disclosure.
Figure 6B:
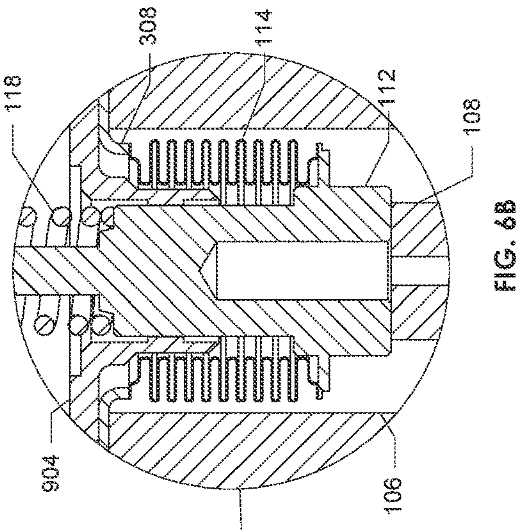
FIG. 6B is a detailed sectional view of FIG. 6A illustrating the integrated bellows actuator, shown in the closed position according to the present disclosure.
Figure 4A:
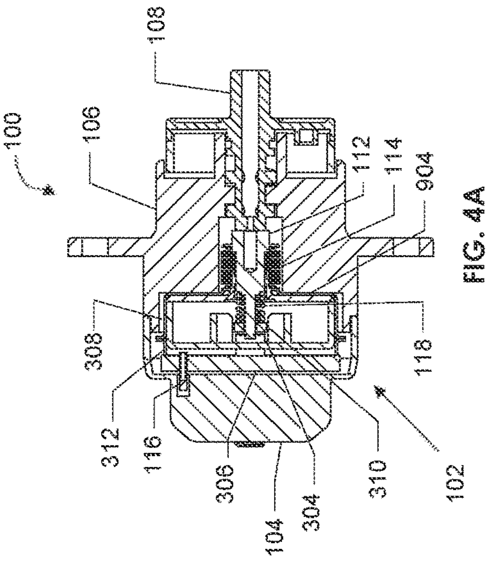
FIG. 4A is a sectional view of FIG. 4 shown in the closed position according to the present disclosure.
Figure 6A:
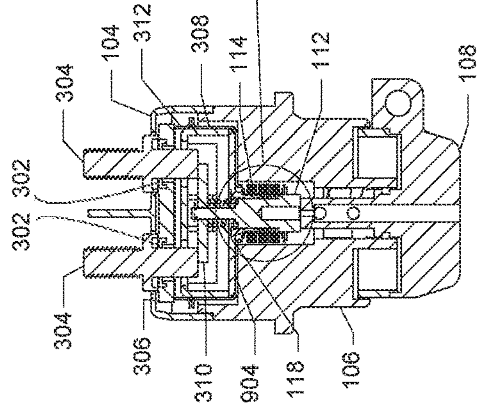
FIG. 6A is a sectional view of FIG. 6 shown in the closed position according to the present disclosure.
Figure 4:
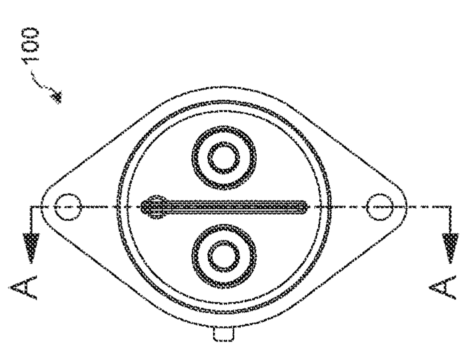
FIG. 4 is a top view of one embodiment of a hermetically sealed high voltage manual disconnect with integrated bellows actuator shown in the closed position according to the present disclosure.
Figure 6:
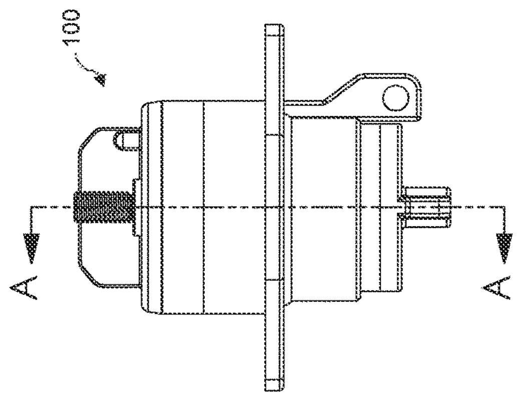
FIG. 6 is a side view of one embodiment of a hermetically sealed high voltage manual disconnect with integrated bellows actuator shown in the closed position according to the present disclosure.
Figure 7:
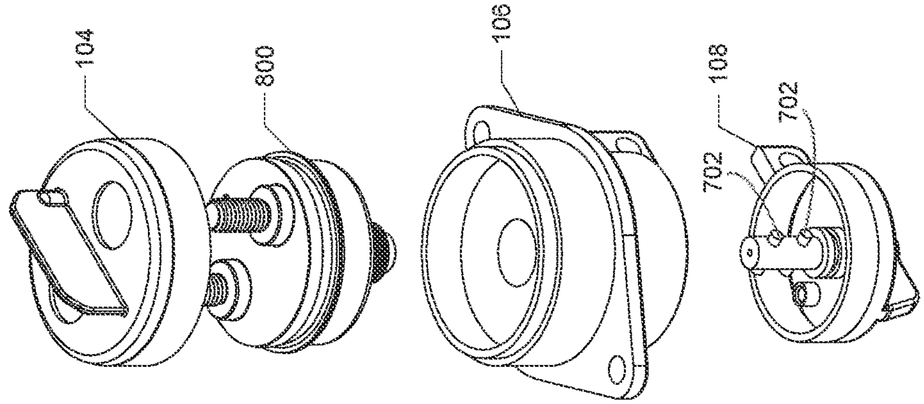
FIG. 7 is a perspective exploded view of the hermetically sealed high voltage manual disconnect with integrated bellows actuator according to the present disclosure.
Figure 10:
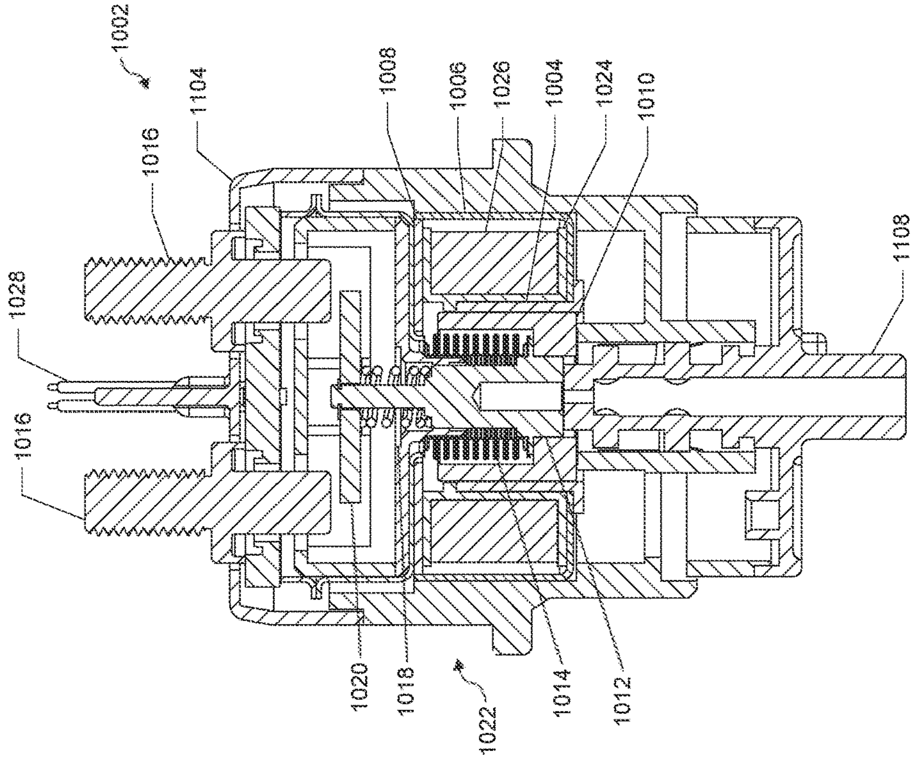
FIG. 10 is a cross sectional side view of a hermetically sealed manual disconnect with integrated bellows actuator and integrated external electromagnetic actuator according to the present disclosure shown in the open position.
Figure 11:
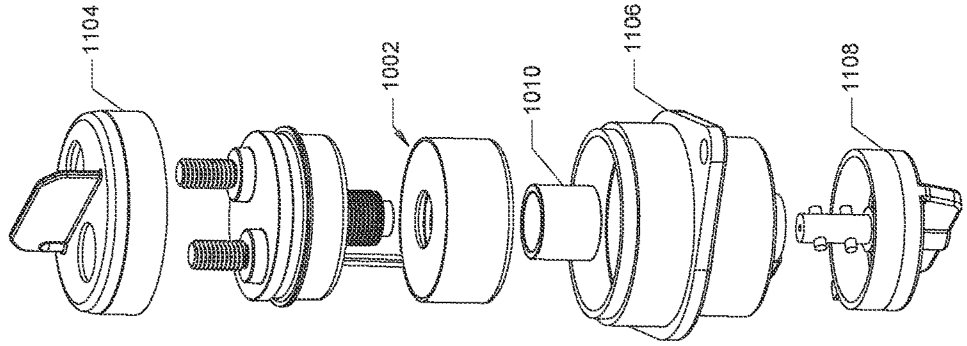
FIG. 11 is an exploded perspective view of a hermetically sealed manual disconnect with integrated bellows actuator and integrated external electromagnetic actuator according to the present disclosure.
Figure 12:
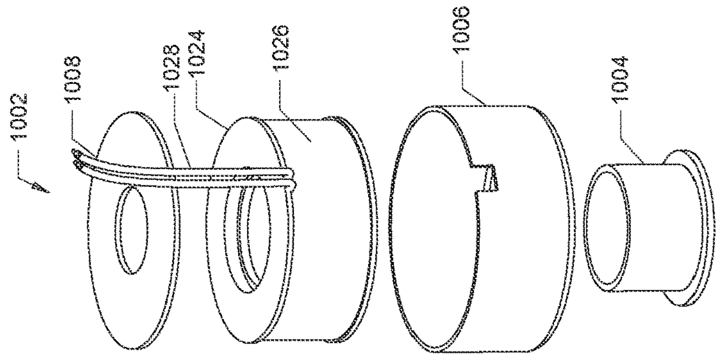
FIG. 12 is an exploded view of the electromagnetic actuator module according to the present disclosure.

Referring to FIGS. 1-9, an embodiment of the present disclosure may include a manual disconnect switching device 100 having an external housing 102 and an internal switching assembly hermetically sealed within an internal volume of the external housing. External housing 102 may include a top cap 104, a lower housing 106, and a handle actuator 108 (which may be manually controlled in an embodiment). As shown in FIG. 3A, top cap 104 has two electrically insulated stationary contact feedthroughs 302. Other embodiments may include more or less than two feedthroughs 302. As shown in FIG. 7, handle actuator 108 has two protrusion features 702 that each communicate with an internal helical guide surface of lower housing 106. Other embodiments may include more or less than two protrusion features 702 that may communicate with more or less than two internal helical guide surfaces. As shown in FIGS. 1A and 3A, the internal switching assembly may include a metal housing 308 having a moveable contact 310. The internal switching assembly may further include a bellows assembly with a shaft 112 in communication with handle actuator 108 at a first end and moveable contact 310 at a second end. Additionally, bellows assembly 908 may include a bellows 114 hermetically sealed at a first end to metal housing 308 and hermetically sealed at a second send to shaft 112. As shown, shaft 112 is located internally to and concentrically aligned with bellows 114. As shown in FIG. 3A, the internal switching assembly also includes two conductive stationary contacts 304 that are hermetically sealed by an electrical isolator substrate 306 through feedthroughs 302 of the top cap 104. Isolator substrate 306 may be a non-conductive hermetic material, such as ceramic or epoxy. It is understood that some embodiments may include more or less than two conductive stationary contacts 304.

In some embodiments, bellows 114 may be biased with spring-like properties and handle actuator 108 may be configured to switch from an open position to a closed position such that, in the closed position, handle actuator 108 applies a force to the internal switching assembly in the direction of stationary contacts 304 that places bellows 114 into a compressed position, and in the open position, handle actuator 108 releases the force to allow the bias of the bellows to return to a resting position. It is understood that in the resting position, the bias of bellows 114 may be in equilibrium or may have a slight preload. In the open position of the embodiment shown, protrusion features 702 are at a first end of the helical guide surfaces, bellows 114 is in the resting position, and moveable contact 310 is not electrically contacting stationary contacts 304. In the closed position, protrusion features 702 are at a second end of the helical guide surfaces such that handle actuator 108 displaces shaft 112 to compress bellows 114 and apply force to the moveable contact such that the moveable contact electrically contacts the stationary contacts.

In some embodiments, top cap 104 may include a hermetically sealed power terminal feedthrough assembly 900. The hermetically sealed power feedthrough assembly may include at least two feedthroughs 302, at least two isolated stationary contacts 304, electrical isolator substrate 306, a metal flange ring 312, and an evacuation tube 116. Stationary contacts 304 may be conductive (e.g., copper or copper alloy) and can be captivated and hermetically sealed to a non-porous, electrical isolator substrate 306 made of a non-conductive material such as ceramic or a ceramic filled epoxy. The electrical isolator substrate can be sealed to a non-porous metal flanged ring 312. Metal flange ring 312 can be Kovar® brand alloy or low carbon steel. Metal flange ring 312 can be hermetically sealed to a corresponding flanged feature of bellows 114, which can be achieved through various sealing methods, such as laser welding, tig welding, or resistance welding. Evacuation tube 116 may be conductive (e.g., copper) and can be hermetically sealed to electrical isolator substrate 306. Evacuation tube 116 may provide leak checking and backfilling for the hermetic switch assembly.

Figure 9:
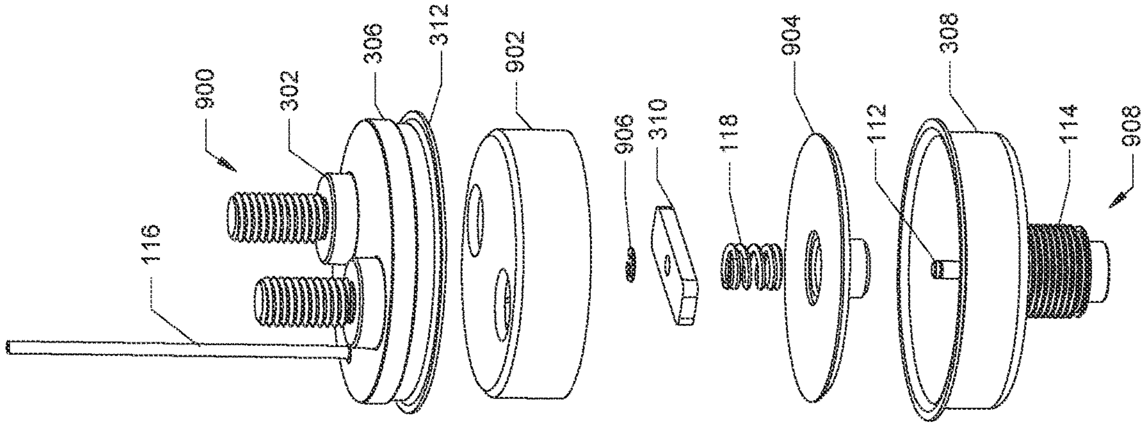
FIG. 9 is a perspective exploded view of the hermetically sealed high voltage manual disconnect switch assembly according to the present disclosure.
Figure 8:
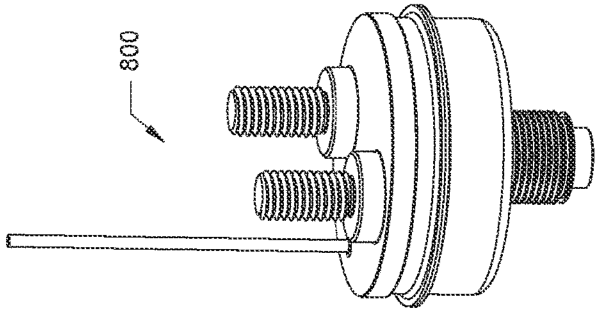
FIG. 8 is a perspective view of the hermetically sealed high voltage manual disconnect switch assembly according to the present disclosure.

As shown in FIGS. 8-9, a hermetically sealed switch assembly 800 with integrated bellows actuator may include an arc chamber 902, a shaft guide 904, a retaining ring 906, a contact spring 118, and moveable contact 310. In one embodiment, arc chamber 902 may be a glass-filled thermoplastic with flame retardant and can align the moveable contact. Shaft guide 904 may be a glass-filled thermoplastic with flame retardant and can be sealed to arc chamber 902. As shown, shaft guide 904 concentrically aligns shaft 112 of bellows assembly 908 to the power feedthrough assembly. Moveable contact 310 may be conductive (e.g., copper or copper alloy), located near shaft 112, and axially captivated and preloaded against shaft 112 by a contact spring 118 and retaining ring 906. In another embodiment, retaining ring 906 can also be replaced by welding a captivating washer to shaft 112. Contact spring 118 may be stainless steel alloy or Inconel® brand superalloy and can be sized to provide the contact force necessary to carry a specific rated current. In the open position of this embodiment, contact spring 118 is initially preloaded against shaft 112. And in the closed position, contact spring 118 is compressed further due to the overtravel or distance shaft 112 continues to move after the point at which moveable contact 310 touches stationary contacts 304. The geometry of shaft 112 allows for contact spring 118 to be nested and reside internally and concentrically to bellows assembly 908, thus allowing a longer and lower spring rate contact spring resulting in a less tolerance sensitive device. In another embodiment, the length of contact spring 118 may be increased to bring it inside the inner diameter of bellows 114, resulting in a reduced spring rate and sensitivity to tolerance stack and contact force variation.

Bellows assembly 908 in one embodiment of the present disclosure may include metal housing 308, bellows 114, and shaft 112. Metal housing 308 may be nonporous and may have a flange feature for sealing to flanged metal ring 312 of the power feedthrough assembly. Metal housing 308 can be hermetically sealed to one open end of bellows 114. Shaft 112 can be hermetically sealed to the other open end of bellows 114. The hermetic seals described herein can be achieved by various sealing methods, such as laser welding, tig welding, brazing, soldering or epoxy bonding. Shaft 112 may be metal and may communicate with contact spring 118 and moveable contact 310. In another embodiment, shaft 112 can include two metal pieces, and yet in another embodiment, the shaft can include two metal ends with an electrical isolating spacer separating them. Bellows 114 may be a non-porous metal and can be designed to be in compression during actuation and when stationary contacts 304 are in the closed position. In general, a bellows structure has a longer mechanical life when utilized in compression versus in tension when expanded. As shown, the outer surface of bellows 114 is adjacent to the external volume, and the internal surface of bellows 114 is adjacent to the internal hermetically sealed volume. Bellows 114 can be designed with a specific spring rate to function as the return spring, which opens the switch when the reaction force of the handle is removed. The spring rate of bellows 114 can be changed by varying the wall thickness, inner diameter and outer diameter. The travel of bellows 114 can be increased by increasing the number of convolutions. When in the free state, bellows 114 (when allowed to move freely) do not require a force to open the contacts. Bellows 114 can be manufactured from seamless or seam welded tubing that is then hydroformed to form the convolution features. Hydroforming is the lowest cost method of manufacturing bellows and will be required to be cost effective.

The external housing may include a top cap and an outer housing. The external housing may be a thermoplastic with good electrical isolating properties. The external housing protects the inner switch assembly, provides electric isolation from terminal to housing, guides and captivates the handle actuator to both open and closed positions, and provides mounting features. The guide features may be helical, allowing for the translation of rotational movement to linear movement. The pitch of the helical guide features can be designed around specific linear travel requirements of internal switch and rotational requirements of handle. The top cap may be a thermoplastic with good electrical isolating properties and can be designed to provide dielectric isolation from terminal to terminal over external surfaces.

Handle actuator 108 may be a thermoplastic with radial protrusions that slide into and against the corresponding helical guide surfaces of the external housing. Handle actuator 108 can be in communication with shaft 112. In some embodiments, when in the open position, bellows 114 is in the free state and in contact with the end of shaft 112. In other embodiments, bellows 114 is preloaded in compression against the end of shaft 112 in the open position. In some embodiments, when in the closed position, handle actuator 108 is rotated 90 degrees translating shaft 112, bellows 114, and the remaining components of the internal switching assembly such that moveable contact 310 is in contact with stationary contacts 304, bellows 114 is compressed, shaft 112 is in an overtravel position, and protrusions of handle actuator 108 are constrained by indent features in corresponding helical guide features in lower housing 106, which can allow for retention of handle actuator 108 at the open and closed positions. In some embodiments, lower housing 106 and handle actuator 108 can be designed to open and close at many different angles. In another embodiment, handle actuator 108 is connected to shaft 112 with a fastener allowing for rotational movement between shaft 112 and handle actuator 108. In one embodiment, handle actuator 108 is not removeable and can be held captivated by one-way snap features of lower housing 106. In another embodiment, handle actuator 108 is removeable. Handle actuator 108 can also provide a through hole feature that concentrically aligns with a corresponding feature in lower housing 106 and manually lock out the device with a padlock. In some embodiments, handle actuator 108 and lower housing 106 can be reconfigured to operate as a push button style actuator, where when the button is pushed down, the contacts open, and when the button is pulled up, the contacts close. In some embodiments, handle actuator 108 and lower housing 106 can be reconfigured to operate as a push button style actuator, where when the button is pushed down, the contacts close, and when the button is pulled up, the contacts open.

Referring to FIGS. 10-13, a second example embodiment of the present disclosure provides a hermetically sealed manual disconnect with integrated bellows actuator and integrated electromagnetic actuator. This embodiment can open and close an electrical circuit through external manual actuation and through an integrated electromagnetic actuator 1002. In the open position, the device is designed to isolate, while in the closed position the device is designed to carry current with minimal heat loss (low contact resistance). Electromagnetic actuation significantly improves switching under load performance when compared to the manual handle actuation. Electromagnetic actuator 1002 can open and close the device quickly and repeatably minimizing the arcing and increasing the contact life. Electromagnetic actuator 1002 is external and concentric to the internal switching assembly (including the bellows assembly), resulting in a compact space saving design. Integrated electromagnetic actuator 1002 adds the functionality of a contactor to the device allowing electrical systems to simplify and reduce part count, cost, and weight.

Figure 13:
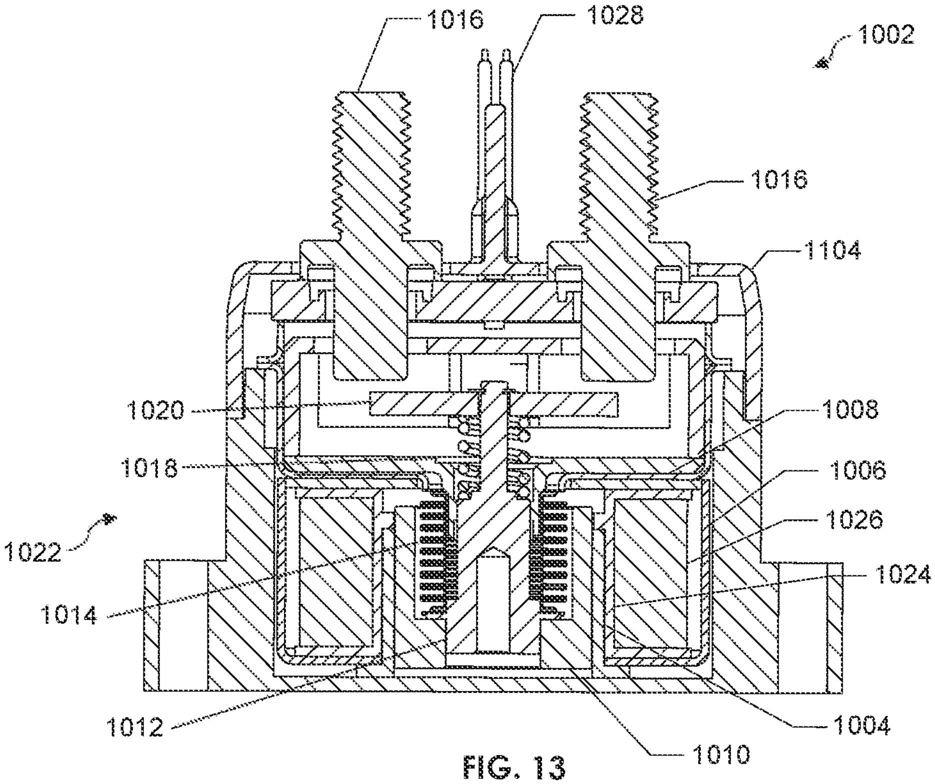
FIG. 13 is a cross sectional view of a hermetically sealed switch assembly with integrated bellows actuator and integrated external electromagnetic actuator according to the present disclosure shown in the open position.
Figure 16:
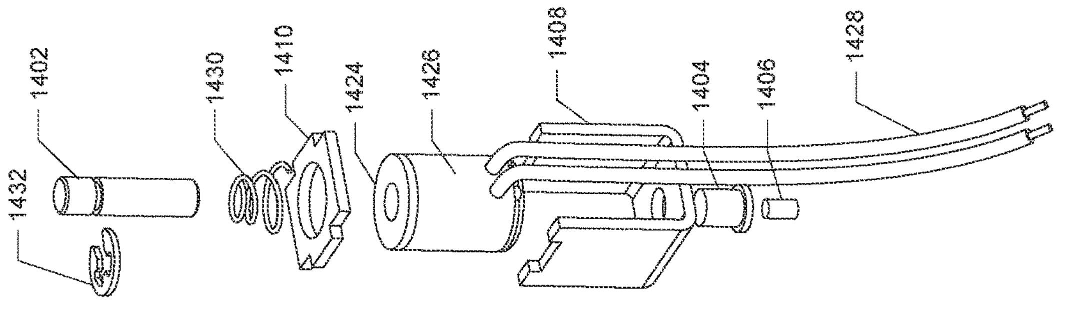
FIG. 16 is an exploded perspective view of the integrated electromagnetic safety lockout module according to the present disclosure.
Figure 15:
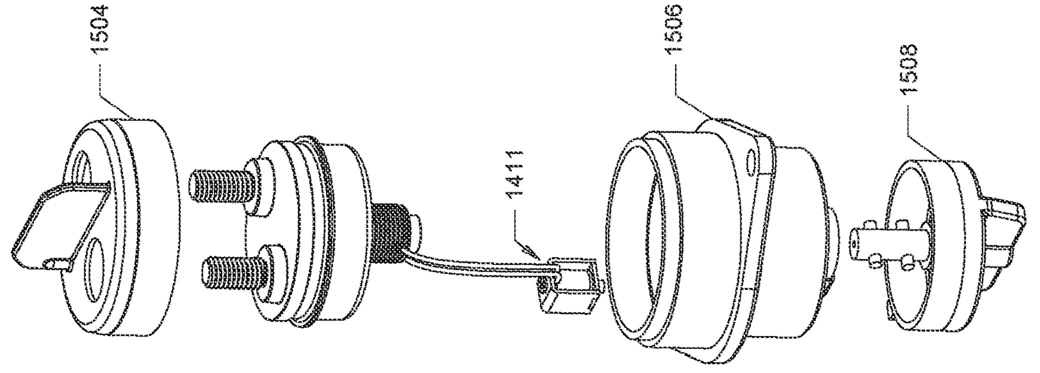
FIG. 15 is an exploded perspective view of a hermetically sealed manual disconnect with integrated bellows actuator and integrated electromagnetic safety lockout according to the present disclosure.
Figure 14:
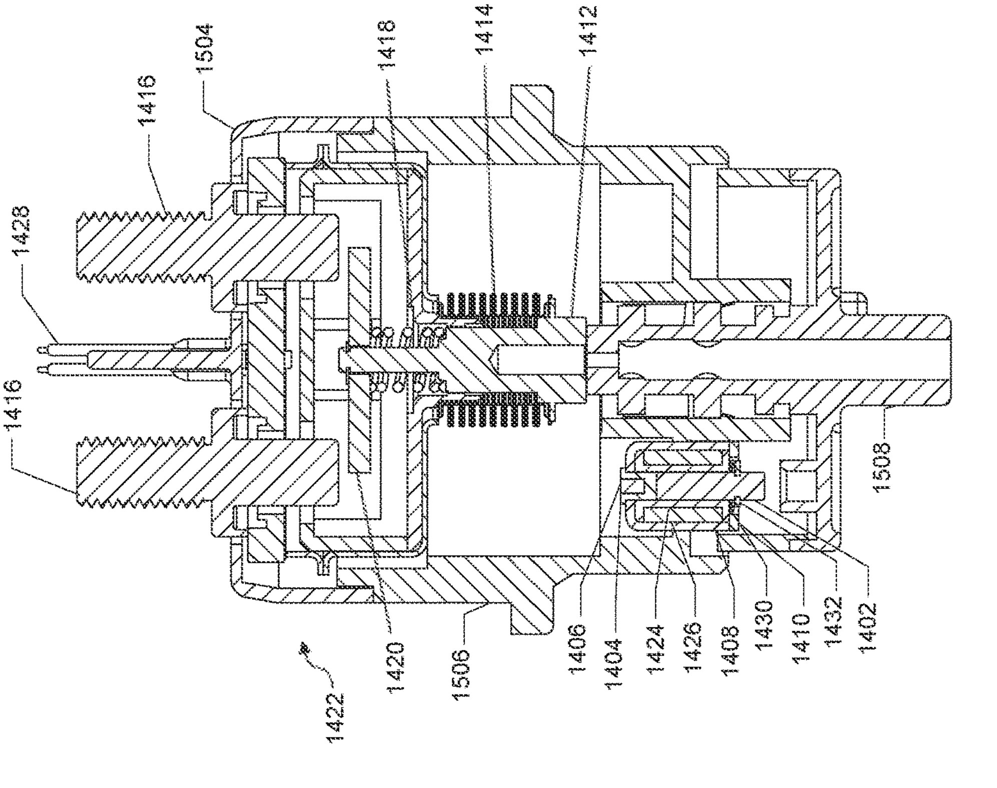
FIG. 14 is a cross sectional side view of a hermetically sealed manual disconnect with integrated bellows actuator and integrated electromagnetic safety lockout shown unlocked in the open position according to the present disclosure.
Figure 17:
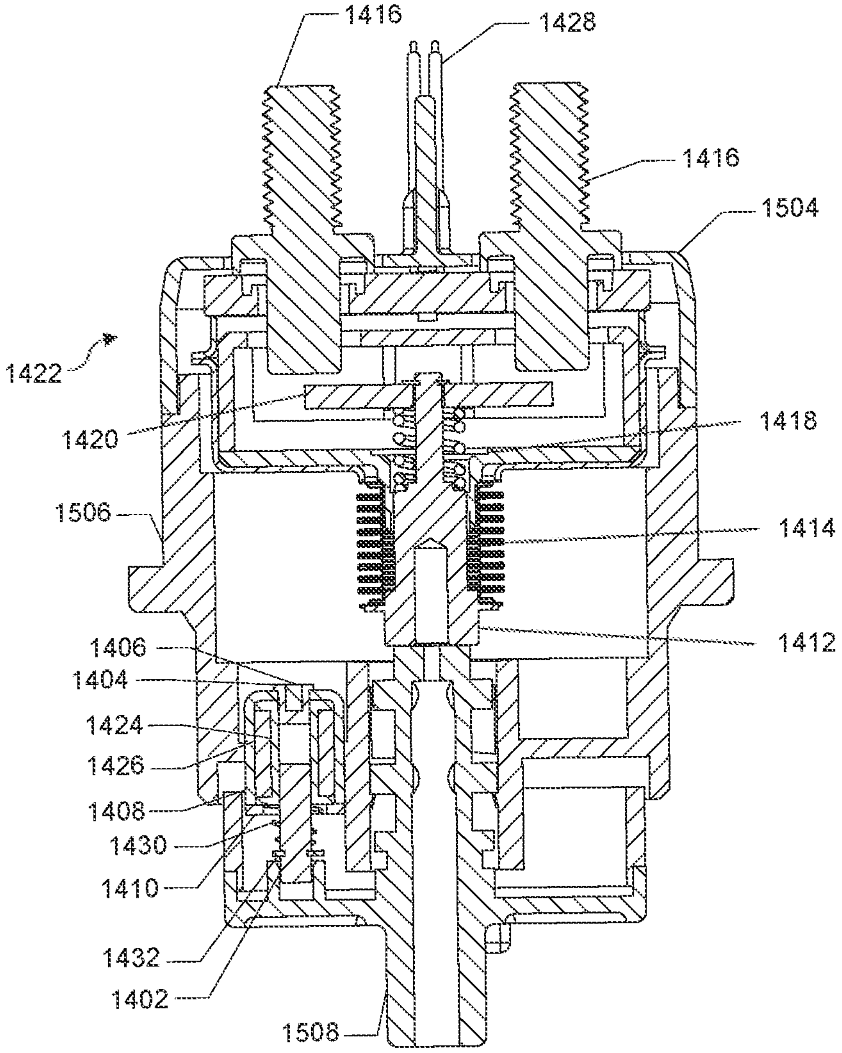
FIG. 17 is a cross sectional side view of a hermetically sealed manual disconnect with integrated bellows actuator and integrated electromagnetic safety lockout shown locked in the open position according to the present disclosure.
Figure 20:
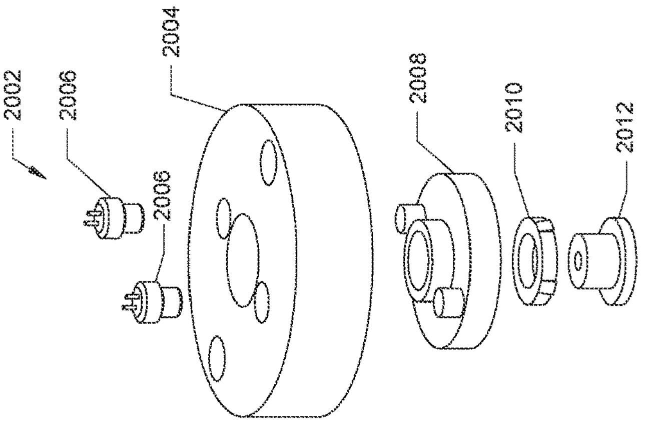
FIG. 20 is an exploded perspective view of the integrated pyrotechnic actuator module according to the present disclosure.
Figure 19:
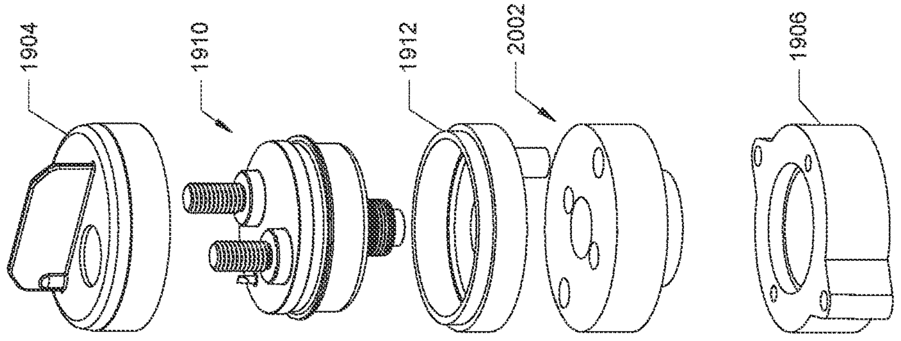
FIG. 19 is an exploded perspective view of a hermetically sealed disconnect switch assembly with integrated bellows actuator and integrated pyrotechnic actuator according to the present disclosure.
Figure 18:
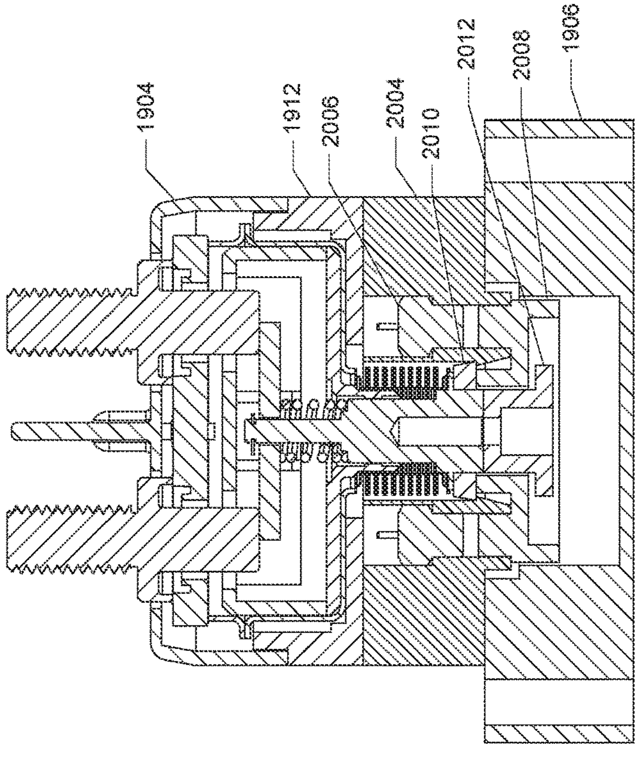
FIG. 18 is a cross sectional side view of a hermetically sealed disconnect switch assembly with integrated bellows actuator and integrated pyrotechnic actuator shown in the closed position according to the present disclosure.
Figure 21:
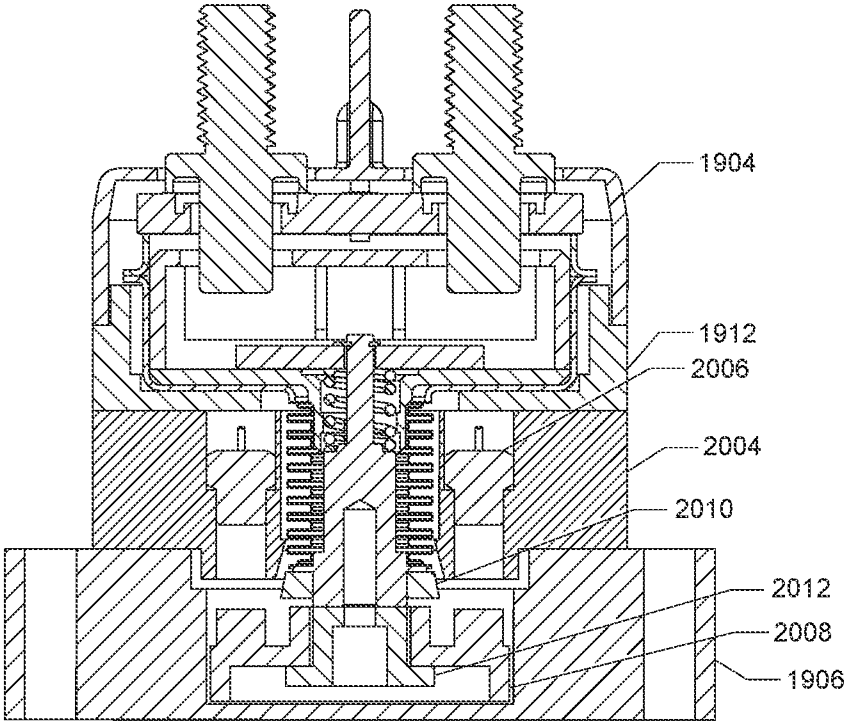
FIG. 21 is a cross sectional side view of a hermetically sealed disconnect switch assembly with integrated bellows actuator and, integrated pyrotechnic actuator shown in the open position according to the present disclosure.
Figure 22:
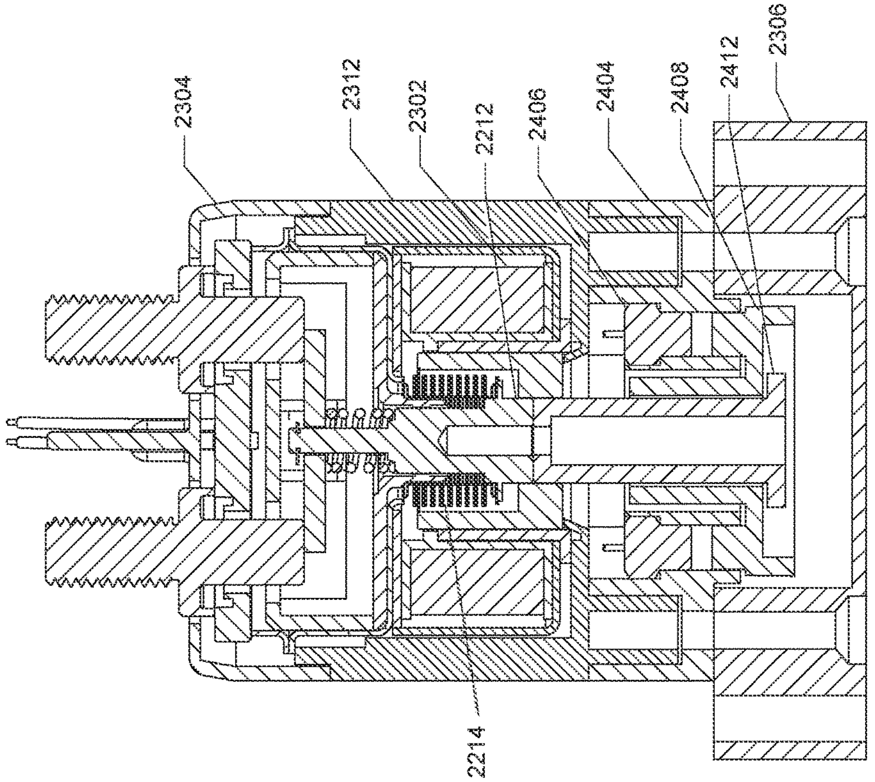
FIG. 22 is a cross sectional side view of a hermetically sealed switch assembly with integrated bellows actuator, integrated external electromagnetic actuator and integrated external pyrotechnic actuator according to the present disclosure shown in the closed position.
Figure 23:
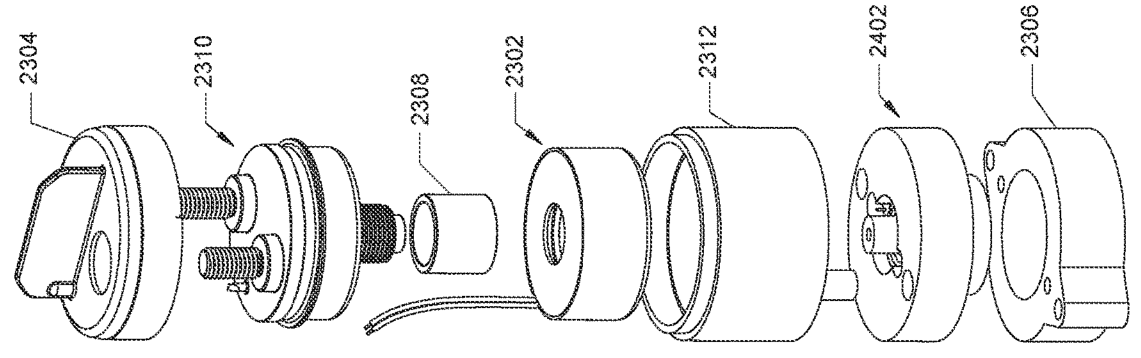
FIG. 23 is an exploded perspective view of a hermetically sealed switch assembly with integrated bellows actuator, integrated external electromagnetic actuator, and integrated external pyrotechnic actuator according to the present disclosure.
Figure 24:
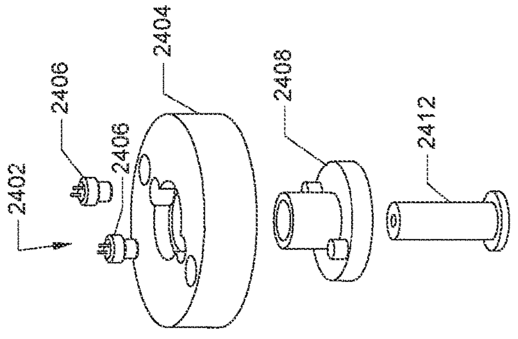
FIG. 24 is an exploded view of the pyrotechnic actuator module according to the present disclosure.
Figure 25:
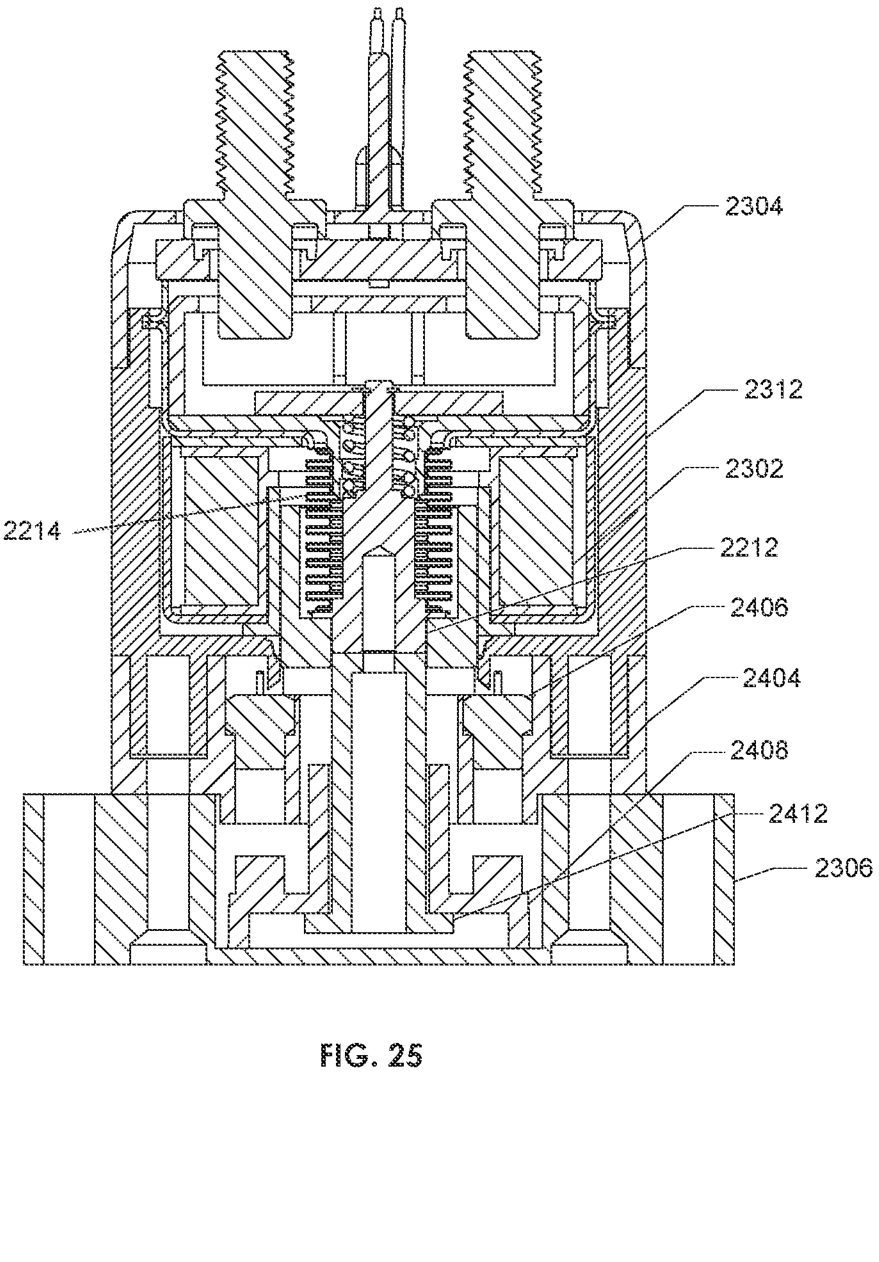
FIG. 25 is a cross sectional view of a hermetically sealed switch assembly with integrated bellows actuator, integrated external electromagnetic actuator and integrated pyrotechnic actuator according to the present disclosure shown in the pyro driven open position.
Figure 28:
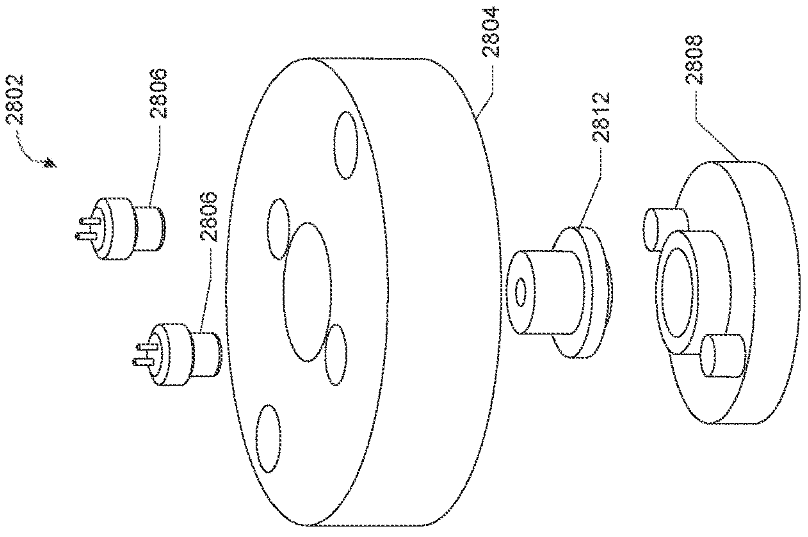
FIG. 28 is an exploded view of the pyrotechnic actuator module according to the present disclosure.
Figure 27:
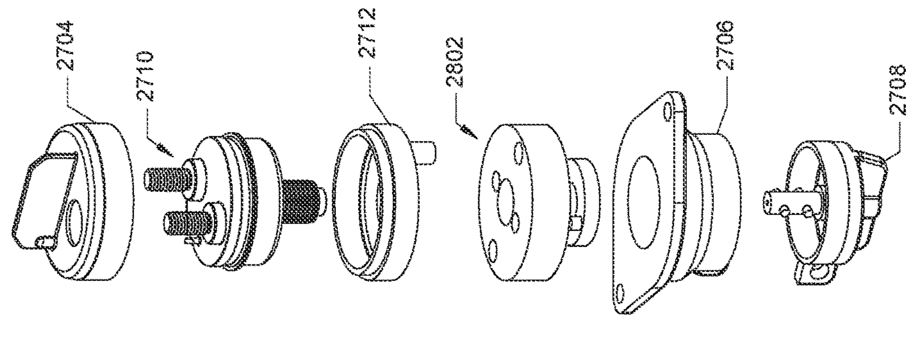
FIG. 27 is an exploded perspective view of a hermetically sealed manual disconnect with integrated bellows actuator and integrated external pyrotechnic actuator according to the present disclosure.
Figure 26:
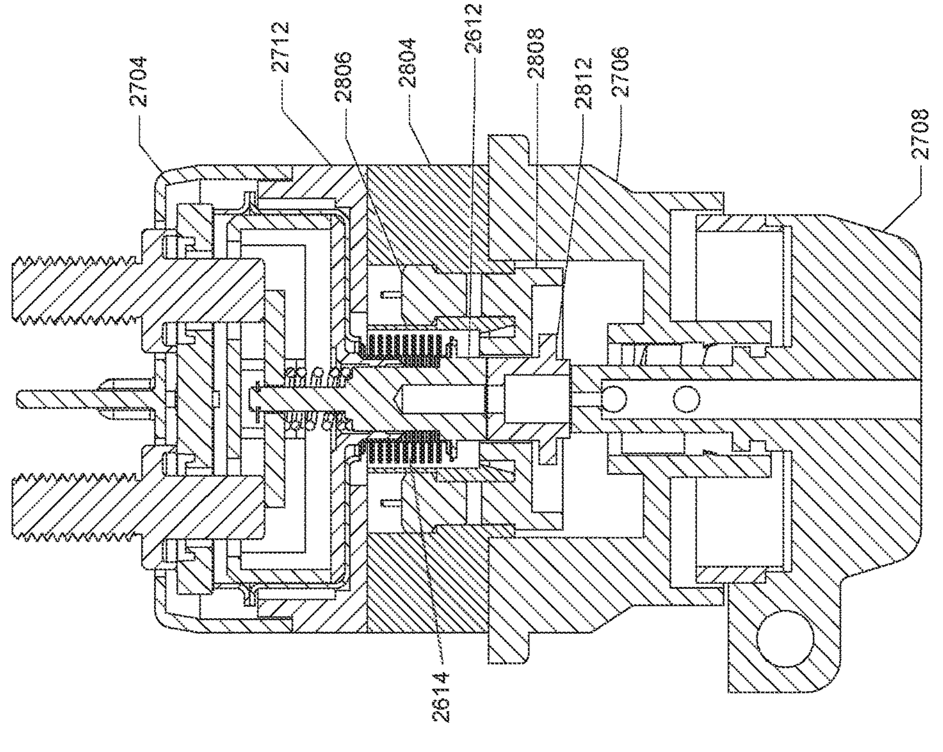
FIG. 26 is a cross sectional side view of a hermetically sealed manual disconnect with integrated bellows actuator and integrated external pyrotechnic actuator according to the present disclosure shown in the closed position.
Figure 29:
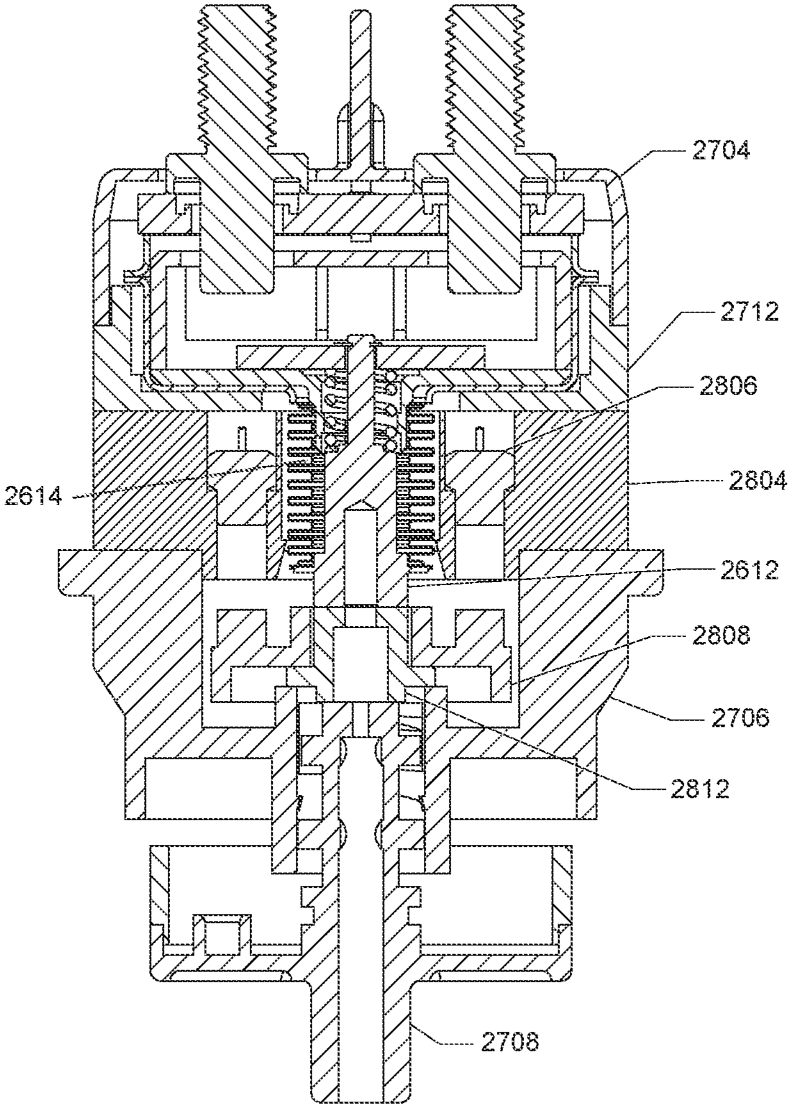
FIG. 29 is a cross sectional view of a hermetically sealed manual disconnect with integrated bellows actuator and integrated pyrotechnic actuator according to the present disclosure shown in the open position and driven by the electro-pyrotechnic actuator.

Integrated electromagnetic actuator 1002 may include a coil assembly, an inner core 1004, an outer core 1006, a top core 1008, and a plunger 1010 and may also include some or all of the elements described in other embodiments discussed herein (e.g., a shaft 1012, a bellows 1014, stationary contacts 1016, a contact spring 1018, moveable contact 1020, external housing 1022, a top cap 1104, a lower housing 1106, and a handle actuator 1108). Some embodiments may not include all of these features; for example, FIG. 13 shows electromagnetic actuator 1002 as a contactor only without a handle actuator.

The coil assembly may include a coil bobbin 1024 (which may be thermoplastic), insulated copper coil windings 1026 (e.g., magnet wire), and coil termination, e.g., coil leads 1028. The coil assembly can be a continuous duty single coil or a dual coil with an economizing circuit to reduce power consumption. Once the magnetic circuit is closed it takes less power to hold the plunger in the closed position. To take advantage of this in the dual coil configuration, both the inner and outer coils can be energized simultaneously to close and fully seat the plunger against the top core. Plunger 1010 can be in communication with shaft 1012. Once plunger 1010 is seated against top core 1008, moveable contact 1020 can be closed against stationary contacts 1016 and shaft 1012 can move to its overtravel position. After a predetermined time delay, the power can be removed from the outer coil, while leaving the inner coil energized. To open the switch assembly, the coil can be de-energized and bellows 1014 can act as a return spring that opens the circuit. In some embodiments, the coil assembly is aligned concentrically with the bellows assembly and fully encircles bellows 1014 making for a compact design. The coil termination to the magnet wire can be done many ways. In an embodiment, insulation piercing termination can be used. In another embodiment, the coil terminations may be welded or soldered.

Inner core 1004 may be a low carbon steel tube with integrated lubrication layer on the inner diameter surface such as Teflon® brand synthetic. Inner core 1004 can provide a path for magnetic flux between outer core 1006 and plunger 1010. Inner core 1004 can also provide a low friction bearing surface for plunger motion to facilitate fast operate and release times. In general, slow operate and release times translates to poor power switching performance. The lubrication will also reduce debris generated by mechanical cycling.

Outer core 1006 may be a low carbon steel cup that provides a path for magnetic flux between top core 1008 and inner core 1004. In one embodiment, outer core 1006 is cylindrical and fully surrounds the coil assembly. In another embodiment, outer core 1006 can be a partial cylinder or a rectangular shape. In some embodiments, the inner diameter of outer core 1006 concentrically aligns with the outer diameter of top core 1008 and is connected to lower housing 1106.

Top core 1008 may be a low carbon steel plate that provides a path for magnetic flux between outer core 1006 and plunger 1010. In one embodiment, top core 1008 is disk shape and nests concentrically in outer core 1006. In other embodiments, top core 1008 can be rectangular or square in shape. Top core 1008 may have a through hole feature to allow for installation around the outer diameter of bellows 1014.

Plunger 1010 may be low carbon steel, cylindrical in shape and concentrically aligned and in communication with shaft 1012 of the bellows assembly. Plunger 1010 can be designed such that bellows 1014 is nested within the inner diameter of plunger 1010, allowing for compact integration. Plunger 1010 can act as the moving element of the magnetic circuit. In one embodiment, current flowing through coil windings 1026 generates a magnetomotive force on plunger 1010. Once the magnetomotive force overcomes the spring force of bellows 1014, plunger 1010 will start to move. As plunger 1010 moves, the air gap between plunger 1010 and top core 1008 becomes increasingly smaller, resulting in a nonlinear increase in pull force on plunger 1010. The contacts are fully closed when plunger 1010 is fully seated against top core 1008. Plunger 1010 is fully seated against top core 1008 once the electromotive force overcomes both the spring forces of bellows 1014 and contact spring 1018 force. At this point, moveable contact 1020 is closed against stationary contacts 1016 and shaft 1012 is in the overtravel position.

Referring to FIGS. 14-17, a third example embodiment provides a hermetically sealed manual disconnect with integrated bellows actuator and integrated electromagnetic safety lockout actuator. This embodiment can open and close an electrical circuit through external manual handle actuation and also can actively lock out said device via low voltage power connection allowing active control of said electromagnetic safety lockout actuator. During times of maintenance, it is important to lock out the disconnect in the open position for safety. This is traditionally done by locking the handle of the manual disconnect to the external housing of the manual disconnect with locking devices such as padlocks. This embodiment provides a way for systems to actively and remotely lock out the manual disconnect in addition to the traditional manual lockout method providing an additional layer of safety that can be controlled by smart systems. This embodiment can allow for the lock out in either open or closed position. In another embodiment, light emitting diode (LED) lights can be integrated to indicate if the powered lockout is engaged.

The integrated electromagnetic safety lockout actuator may include a coil assembly, a plunger 1402, an inner core 1404, a permanent magnet 1406, an outer core 1408, a top core 1410, and an electromagnetic lockout module 1411 and may also include some or all of the elements described in the first and second embodiments (e.g., a shaft 1412, a bellows 1414, stationary contacts 1416, a contact spring 1418, a moveable contact 1420, external housing 1422, a top cap 1504, a lower housing 1506, and a handle actuator 1508).

The coil assembly may include a bobbin 1424 (which may be thermoplastic), insulated copper coil windings 1426 (e.g., magnet wire), and coil termination 1428 (e.g., lockout coil leads (as shown), insulation piercing terminals, solder terminals, or spot-welded terminals). Bobbin 1424 can function as a bearing for plunger 1402 movement. In one embodiment, the coil assembly is of permanent magnet 1406 latching type in order to reduce power consumption. In other embodiments, the coil assembly can be configured as a continuous duty single coil or a dual coil. In an embodiment, insulation piercing termination can be used. In another embodiment, coil terminations 1428 can be welded or soldered.

Plunger 1402 may be low carbon steel and act as the moving element of the magnetic circuit. Plunger 1402 can provide the path for magnetic flux between inner 1404 core and top core 1410. In the unlocked position, plunger 1402 is seated against inner core 1404. In the locked out position, plunger 1402 is engaged in a corresponding cavity of the handle. In this embodiment, plunger 1402 is in communication with a return spring 1430, which biases plunger 1402 in the locked-out position.

Inner core 1404 may be low carbon steel and cylindrical in shape with a counter bore feature for housing permanent magnet 1406 used to latch plunger 1402 in the unlocked position. Inner core 1404 can provide a path for magnetic flux between outer core 1408 and plunger 1402 and can position coil bobbin 1424 centrally within outer core 1408.

Permanent magnet 1406 may be located inside inner core 1404. In other embodiments, permanent magnet 1406 can be connected to outer core 1408 and can be located in many other positions. A pulse of current in the reverse polarity can significantly reduce the holding force of permanent magnet 1406 resulting in return spring 1430 pushing plunger 1402 into the locked-out position.

Outer core 1408 may be a low carbon steel stamped part and can provide a path for magnetic flux between top core 1410 and inner core 1404. In one embodiment, outer core 1408 is rectangular in shape and partially surrounds the coil assembly. In another embodiment, outer core 1408 can be cylinder in shape. Outer core 1408 can locate and connect to inner core 1404. This connection can be done by various methods, such as swaging, welding or by retaining ring 1432. Outer core 1408 can captivate and locate the coil assembly.

Top core 1410 can also provide a path for magnetic flux between outer core 1408 and plunger 1402. Top core 1410 can provide a cavity for return spring 1430 when compressed and in the unlocked position. In one embodiment, top core 1410 is a rectangular shape. In other embodiments, top core 1410 can be disk or square in shape.

Return spring 1430 can be captivated by plunger 1402 and a retaining ring 1432 and held in compression against coil bobbin 1424. In an embodiment, return spring 1430 is a tapered compression spring allowing or the smallest compressed height. In other embodiments, the compression spring is not tapered.

Handle actuator 1508 can be utilized as described above with the first embodiment. In addition, handle actuator 1508 in this embodiment may have an integrated boss feature that accepts plunger 1402 when in the locked-out position. Once plunger 1402 is engaged with handle actuator 1508, rotational movement of handle actuator 1508 is not possible.

Referring to FIGS. 18-21, a fourth example embodiment of the present disclosure provides a compact hermetically sealed safety disconnect with integrated bellows actuator and integrated external electro-pyrotechnic actuator. This embodiment can open an electrical circuit solely via external pyrotechnic/electro-pyrotechnic actuation and can actively trigger the electro-pyrotechnic actuator through low voltage connections. This embodiment can be designed to be installed in the electric circuit in the normally closed position and can remain in the normally closed position until the system senses a short circuit or other emergency related event in which it will actively trigger the electro-pyrotechnic actuator through a low voltage power source. Once ignited, the electro-pyrotechnic actuator is capable of rapidly opening and clearing a short circuit load thus providing electrical isolation to the system. In another embodiment, the device can passively trigger the pyrotechnic actuator, such as by an internal current sensor, temperature sensor, or reed switch.

The hermetically sealed disconnect with integrated bellows actuator and integrated external pyrotechnic actuator may include a top cap 1904 as described in the first embodiment, a lower housing 1906, a hermetically sealed disconnect switch 1910 with integrated bellows actuator as described in the first embodiment, a pyrotechnic actuator module 2002, and an upper housing 1912.

The pyrotechnic actuator module 2002 may include a pyrotechnic actuator housing 2004, at least one pyrotechnic initiator 2006, a pyrotechnic impactor 2008, a preload snap ring 2010, a shaft coupling 2012, and an electrical connection to a power source (e.g., printed circuit board socket connector, printed circuit board solder connection, insulated flying leads or lead frame).

Upper housing 1912 may be a glass filled thermoplastic cylindrical structure and may connect to top cap 1904 and a pyrotechnic actuator housing 2004. Upper housing 1912 is aligned concentrically with the hermetically sealed disconnect switch 1910 and pyrotechnic housing 2004.

Pyrotechnic actuator housing 2004 may be a glass-filled thermoplastic and may connect to and align concentrically with upper housing 1912 and lower housing 1906. Pyrotechnic actuator housing 2004 may locate and house at least one pyrotechnic initiator 2006. Pyrotechnic actuator housing 2004 may coaxially align pyrotechnic impactor 2008 to corresponding blast chambers of pyrotechnic initiator 2006 and can provide a captive snap feature, which secures preload snap ring 2010 in place when the device is in the closed position.

In one embodiment, the pyrotechnic initiator 2006 can provide the sole ability to open the internal hermetically sealed disconnect switch. At least one pyrotechnic initiator 2006 can be connected to the system at low voltage and may only ignite when the system sends a specified current for a specified duration. In some embodiments, the energetic material of pyrotechnic actuator module 2002 may include zirconium-potassium perchlorate. In other embodiments, many other energetic materials may be used, such as zirconium hydride-potassium perchlorate, titanium hydride-potassium perchlorate, and boron-potassium nitrate.

Pyrotechnic impactor 2008 may be a glass-filled thermoplastic and can be aligned coaxially with hermetically sealed disconnect switch 1910. When in the closed position, pyrotechnic impactor 2008 can be connected to and located by shaft coupling 2012. When the pyrotechnic initiator 2006 ignites, pressure builds rapidly, forcing pyrotechnic impactor 2008 to break free from axial connection with shaft coupling 2012 and move into contact with the shoulder of shaft coupling 2012, forcing hermetically sealed disconnect switch 1910 into the open position.

Preload snap ring 2010 may be a thermoplastic or metal material, located coaxially with pyrotechnic actuator housing 2004, and in communication with the shaft end of hermetically sealed disconnect switch 1910. Snap ring 2010 can hold the device in the closed position via retention snap features in pyrotechnic actuator housing 2004.

Shaft coupling 2012 may be a thermoplastic or metal material, located coaxially with pyrotechnic actuator housing 2004, and in communication with the shaft end of hermetically sealed disconnect switch 1910. Once the pyrotechnic initiator 2006 is fired, pyrotechnic impactor 2008 rapidly drives shaft coupling 2012 and the connected shaft end of the switch module to the open position.

In the present disclosure, providing electrical connection to a power source can be achieved by various components. In some embodiments, pyrotechnic initiators 2006 are electrically connected to a lead frame or lead wires that electrically connects to a standard static safety squib connector located on an external surface of the device. In some embodiments, pyrotechnic initiators 2006 are electrically connected to a printed circuit board that electrically connects to a standard static safety squib connector located on an external surface of the device. In some embodiments, the pyrotechnic initiators 2006 are electrically connected to flying leads that electrically connect to a standard static safety squib connector located on an external wire harness on the device.

In one embodiment, lower housing 1906 may be a glass-filled thermoplastic cylindrical structure that coaxially aligns and connects to pyrotechnic actuator housing 2004. Lower housing 1906 can be aligned concentrically with hermetically sealed disconnect switch 1910 and pyrotechnic actuator housing 2004 and can provide a containment volume for pyrotechnic impactor 2008 to travel into when pyrotechnic initiators 2006 are activated.

Referring to FIGS. 22-25, a fifth example embodiment of the present disclosure provides a compact hermetically sealed safety disconnect with integrated bellows actuator as described in the first embodiment, an integrated external electromagnetic actuator as described in the second embodiment, and an integrated external pyrotechnic/electro-pyrotechnic actuator as described in the fourth embodiment. This embodiment can open an electrical circuit via an external electromagnetic actuator as a contactor for normal switching operation or via a pyrotechnic actuation as a pyro fuse for safely opening a circuit during a short circuit condition. This embodiment can be designed to be installed in the electric circuit in the normally open position and remain in the normally open position until the system energizes the electromagnetic actuator or senses a short circuit or other emergency related event in which it will actively trigger the electro-pyrotechnic actuator through a low voltage power source. Once ignited, the pyrotechnic actuator is capable of rapidly opening and clearing a short circuit load thus providing electrical isolation to the system. In another embodiment, the device can passively trigger the pyrotechnic actuator, such as by an internal current sensor, temperature sensor, or reed switch.

One embodiment of the present disclosure provides a compact multifunctional hermetically sealed disconnect switch with integrated bellows actuator, an integrated external electromagnetic actuator, and an integrated external pyrotechnic actuator. The embodiment may include a hermetically sealed safety disconnect switch 2310 with integrated bellows actuator (including a shaft 2212 and a bellows 2214) as described with the first embodiment, an integrated external electromagnetic actuator module 2302 as described with the second embodiment, an integrated external pyrotechnic actuator module 2402 as described with the fourth embodiment, a top cap 2304 as described with the first embodiment, a lower housing 2306, a plunger 2308, and an upper housing 2312 as described with the fourth embodiment.

Pyrotechnic actuator module 2402 may include a pyrotechnic actuator housing 2404, at least one pyrotechnic initiator 2406, a pyrotechnic impactor 2408, a shaft coupling 2412, and an electrical connection to power source (e.g., printed circuit board socket connector, printed circuit board solder connection, insulated flying leads or lead frame).

Pyrotechnic actuator housing 2404 may be a glass-filled thermoplastic and can connect to and align concentrically with the upper housing 2312 and the lower housing 2306. Pyrotechnic actuator housing 2404 can locate and house at least one electro-pyrotechnic initiator 2406. Pyrotechnic actuator housing 2404 may coaxially align pyrotechnic impactor 2408 to corresponding blast champers of pyrotechnic initiator 2406 and can provide captive snap features which secure a preload snap ring (similar to snap ring 2010) in place when the device is in the closed position.

Pyrotechnic initiator 2406 can open the internal hermetically sealed disconnect switch. At least one electro-pyrotechnic initiator 2406 can be connected to the system at low voltage and may only ignite when the system sends a specified current for a specified duration. The energetic material of pyrotechnic actuator 2402 may include zirconium-potassium perchlorate. Many other energetic materials can also be used, such as zirconium hydride-potassium perchlorate, titanium hydride-potassium perchlorate, and boron-potassium nitrate.

Pyrotechnic impactor 2408 may be a glass-filled thermoplastic or metal and can be aligned coaxially with the hermetically sealed disconnect switch. When in the closed position, the impactor can be connected to and located by shaft coupling 2412. When pyrotechnic initiator 2406 ignites, pressure builds rapidly, forcing pyrotechnic impactor 2408 to break free from an axial connection with shaft coupling 2412 and move into contact with the shoulder of shaft coupling 2412, forcing the hermetically sealed disconnect switch into the open position.

Shaft coupling 2412 may be a thermoplastic or metal material, located coaxially with pyrotechnic actuator housing 2404, and in communication with the shaft end of the hermetically sealed disconnect switch.

In this embodiment, an electrical connection to power source can be achieved as described with the second and fourth embodiments.

Upper housing 2312 may be a glass filled thermoplastic cylindrical structure and can connect to top cap 2304 and pyrotechnic actuator housing 2404. Upper housing 2312 can house the hermetically sealed disconnect switch module and electromagnetic actuator modules, which are all aligned concentrically.

Referring to FIGS. 26-29, a sixth example embodiment of the present disclosure provides a compact hermetically sealed manual safety disconnect with integrated bellows actuator as described in the first embodiment and integrated external pyrotechnic/electro-pyrotechnic actuator as described in the fourth embodiment. This embodiment can open an electrical circuit via a manual handle actuator for normal switching operation or via an pyrotechnic actuation as a pyro fuse for safely opening a circuit during a short circuit condition. This embodiment is designed to be installed in the electric circuit in the normally open position and can remain in the normally open position until the user manually rotates the handle actuator into the on position. If the system senses a short circuit or other emergency related event, it will actively trigger the pyrotechnic actuator through a low voltage power source. Once ignited, the pyrotechnic actuator is capable of rapidly opening and clearing a short circuit load thus providing electrical isolation to the system. In another embodiment, the device can passively trigger the pyrotechnic actuator, such as by an internal current sensor, temperature sensor, or reed switch.

An embodiment of the present disclosure provides a compact multifunctional hermetically sealed manual disconnect switch with integrated bellows actuator and an integrated external pyrotechnic actuator. This embodiment may include a hermetically sealed manual disconnect switch 2710 with an integrated bellows actuator (including a shaft 2612 and a bellows 2614) as described in the first embodiment, an integrated external pyrotechnic actuator module 2802 as described in the fourth embodiment, a top cap 2704 as described in the first embodiment, a lower housing 2706 and an upper housing 2712 as described in the fourth embodiment, a shaft coupling 2812, and a handle actuator 2708 as described in the first embodiment.

Lower housing 2706 may be a thermoplastic with good electrical isolating properties. Lower housing 2706 can be connected to and aligned concentrically with a pyrotechnic housing 2804 and can provide a containment volume for pyrotechnic impactor 2808 to travel into when one or more pyrotechnic initiators 2806 are activated. Lower housing 2706 can guide and captivate handle actuator 2708 to both open and closed positions and provide mounting features. The guide features may be helical, allowing for the translation of rotational movement to linear movement. The pitch of the helical guide features can be designed around specific linear travel requirements of internal switch and rotational requirements of handle actuator 2708.

Many modifications and other embodiments of the disclosure set forth herein will come to mind to one skilled in the art to which these inventions pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A manual disconnect switching device comprising:

an external housing comprising:

a top cap having at least two electrically insulated stationary contact feedthroughs;

a lower housing having at least two helical guide surfaces that are inside the lower housing; and a manual handle actuator having at least two protrusion features that each communicate with a corresponding one of the helical guide surfaces; and an internal switching assembly hermetically sealed within an internal volume of the external housing, the internal switching assembly comprising:

a metal housing comprising a moveable contact;

a shaft in communication with the handle actuator and the moveable contact;

a biased bellows comprising first and second ends, wherein the first end is hermetically sealed to the metal housing and the second end is hermetically sealed to the shaft, wherein the shaft is located internally to the bellows and at least partially protrudes through both the first end and the second end of the bellows; and at least two conductive stationary contacts that are hermetically sealed by an electrical isolator substrate through the feedthroughs of the top cap, wherein the handle actuator is switchable from an open position to a closed position, wherein, in the closed position, the handle actuator applies a force to the internal switching assembly in a direction toward the stationary contacts that places the bellows into a compressed position, and in the open position, the handle actuator releases the force to allow bias of the bellows to return the bellows to a resting position.

2. The manual disconnect switching device of claim 1, wherein, in the open position, the protrusion features are at a first end of the helical guide surfaces and the moveable contact is not electrically contacting the stationary contacts.

3. The manual disconnect switching device of claim 2, wherein, in the closed position, the protrusion features are at a second end of the helical guide surfaces causing the handle actuator to displace the shaft to compress the bellows and apply force to the moveable contact to create electrical contact between the moveable contact and the stationary contacts.

4. The manual disconnect switching device of claim 1, wherein the internal switching assembly further comprises a contact spring located adjacent to the shaft.

5. The manual disconnect switching device of claim 4, wherein the contact spring is at least partially internal to the bellows.

6. The manual disconnect switching device of claim 4, wherein the contact spring is completely external to the bellows.

7. The manual disconnect switching device of claim 4, wherein, in the closed position, the force of the handle actuator displaces the shaft and the contact spring in the direction of the stationary contacts, which causes the moveable contact to electrically contact the stationary contacts.

8. The manual disconnect switching device of claim 4, wherein the internal switching assembly further comprising an arc chamber configured to align the moveable contact to the contact spring.

9. The manual disconnect switching device of claim 1, wherein the bellows is corrosion resistant and heat resistant.

10. The manual disconnect switching device of claim 1, wherein the bellows comprises an internal surface and an external surface, the internal surface of the bellows is adjacent to the internal volume of the external housing and the external surface of the bellows is adjacent to an external environment outside of the hermetically sealed internal switching assembly.

11. The manual disconnect switching device of claim 1, wherein the shaft is a singular conductive structure.

12. The manual disconnect switching device of claim 1, wherein the bellows is formed by a non-permeable, hydroformed metal material.

13. The manual disconnect switching device of claim 1, wherein the first and second ends of the bellows are hermetically sealed by welding.

14. The manual disconnect switching device of claim 1, wherein the electrical isolator substrate is hermetically sealed to a circumferential metal flange and the metal flange is hermetically sealed to the metal housing.

15. The manual disconnect switching device of claim 1, wherein the helical guide surfaces have features to allow for retention of the handle actuator at the open and closed positions.

16. The manual disconnect switching device of claim 1, wherein the protrusion features are radial protrusions, each of the radial protrusions configured to communicate with the corresponding one of the helical guide surfaces by sliding the radial protrusion into and against the corresponding one of the helical guide surfaces.

17. The manual disconnect switching device of claim 1, wherein, in the closed position, the handle actuator is rotatable to translate the bellows of the internal switching assembly to compress the bellows and, thereby, apply a force to the moveable contact to create electrical contact between the moveable contact and the stationary contacts, and wherein the each of the helical guide surfaces comprise indent features, and wherein, in the closed position, the handle actuator is rotatable to translate the shaft to an overtravel position and to retain the protrusions features by the corresponding helical guide surfaces, wherein each of the protrusion features is configured to be retained by the indent features for each of the corresponding helical guide surfaces.

18. The manual disconnect switching device of claim 1, further comprising a shaft guide configured to concentrically align the shaft of the bellows to the at least two electrically insulated stationary contact feedthroughs.

19. The manual disconnect switching device of claim 1, wherein the shaft comprises two metal ends separated by an electrical isolating spacer.

20. A manual disconnect switching device comprising:
an external housing comprising:
a top cap having one or more stationary contact feedthroughs;
a lower housing having one or more helical guide surfaces that are inside the lower housing, wherein each of the helical guide surfaces comprise indent features; and
a manual handle actuator having one or more protrusions, each of the one or more protrusions communicating with a corresponding one of the helical guide surfaces wherein each of the one or more protrusions is configured to be retained by the indent features for each of the corresponding helical guide surfaces; and
an internal switching assembly sealed within an internal volume of the external housing, the internal switching assembly comprising:
a housing comprising a moveable contact;
a shaft in communication with the handle actuator and the moveable contact;
a bellows comprising first and second ends, wherein the first end is sealed to the housing and the second end is sealed to the shaft, wherein the shaft is located internally to the bellows; and
one or more conductive stationary contacts that are sealed by an electrical isolator substrate through the feedthroughs of the top cap,
wherein the handle actuator is switchable from an open position to a closed position, wherein, in the closed position, the handle actuator is rotatable to: (i) translate the bellows of the internal switching assembly to compress the bellows and thereby apply a force to the moveable contact to create electrical contact between the moveable contact and the stationary contacts and (ii) translate the shaft to an overtravel position and to retain the protrusions by the corresponding helical guide surfaces, and in the open position, the handle actuator releases the force to allow bias of the bellows to return the bellows to a resting position.

* * * * *